United States Patent
Dong (10) Patent No.: US 12,184,732 B2
(45) Date of Patent: Dec. 31, 2024

(54) MACHINE LEARNING SYSTEMS AND METHODS FOR API DISCOVERY AND PROTECTION BY URL CLUSTERING WITH SCHEMA AWARENESS

(71) Applicant: Fortinet, Inc., Sunnyvale, CA (US)

(72) Inventor: Xihua Dong, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 390 days.

(21) Appl. No.: 17/374,692

(22) Filed: Jul. 13, 2021

(65) Prior Publication Data

US 2023/0034914 A1 Feb. 2, 2023

(51) Int. Cl.
| | |
|---|---|
| *H04L 29/06* | (2006.01) |
| *G06F 16/22* | (2019.01) |
| *G06F 18/22* | (2023.01) |
| *G06K 9/62* | (2022.01) |
| *H04L 29/08* | (2006.01) |
| *H04L 67/133* | (2022.01) |
| *H04L 67/51* | (2022.01) |

(52) U.S. Cl.
CPC ........ *H04L 67/133* (2022.05); *G06F 16/2246* (2019.01); *G06F 18/22* (2023.01); *H04L 67/51* (2022.05)

(58) Field of Classification Search
None
See application file for complete search history.

(56) References Cited

U.S. PATENT DOCUMENTS

| | | | | |
|---|---|---|---|---|
| 2010/0088351 | A1* | 4/2010 | Dehmann | G06Q 10/10 707/E17.005 |
| 2012/0059840 | A1* | 3/2012 | Reddy | G06F 16/256 707/763 |
| 2015/0244728 | A1* | 8/2015 | Tao | H04L 63/1483 726/23 |
| 2018/0176242 | A1* | 6/2018 | Shibahara | H04L 63/1416 |
| 2018/0293381 | A1* | 10/2018 | Tseng | G06N 20/00 |
| 2019/0173897 | A1* | 6/2019 | Okano | G06F 21/552 |
| 2019/0251251 | A1* | 8/2019 | Carson | G06F 21/561 |
| 2021/0103683 | A1* | 4/2021 | Scarpantoni | G06F 13/102 |

* cited by examiner

*Primary Examiner* — Umut Onat
(74) *Attorney, Agent, or Firm* — Jaffery Watson Hamilton & DeSanctis LLP (57) ABSTRACT

An application programming interface discovery system is disclosed, including a processing resource to execute instructions to receive a tree structure, wherein the tree structure includes at least a first branch indicating a URL, a method, and a schema corresponding to a first network traffic, receive a second branch indicating a URL, a method, and a schema corresponding to a second network traffic, consider URLs and methods of a number of branches of the tree structure to as a cluster, wherein the cluster includes at least a subset of the URL and method of first branch and a subset of the URL and method of the second branch and merge at least some of the schema associated with the branches incorporated in the cluster, wherein at least the schema of the first branch is merged with the schema of the second branch.

21 Claims, 7 Drawing Sheets

```
{
  "name": {
      "type": "string"
  }
}

{
  "age": {
      "type": "number"
  }
}
```

```
{
  "name": {
        "type": "string"
  }
  "age": {
        "type": "number"
  }
}
```

FIG. 4

```
{
  "value": {
      "type": "number"
  }
}

{
  "value": {
      "type": "string"
  }
}
```

```
{
  "value": {
      "anyOf" : [
          {"type": "string"}
          {"type": "number"}
      ]
  }
}
```

MACHINE LEARNING SYSTEMS AND METHODS FOR API DISCOVERY AND PROTECTION BY URL CLUSTERING WITH SCHEMA AWARENESS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, Fortinet, Inc.

BACKGROUND

Field

Embodiments of the present disclosure generally relate to network security, and more particularly to systems and methods for discovering APIs for use in relation to network application security.

Description of the Related Art

Setting up a web application firewall (WAF) can include using an application programming interface (API) that identifies the type of network traffic that should be expected when operating a particular application in a network environment. In operation, the WAF compares network traffic with the API to determine if the traffic is expected. Where the traffic is expected, it is allowed. Otherwise, the network traffic is identified as potentially malicious and may be denied. A problem happens when the API is either not provided by the owner of the application or is not correct. In such cases, the WAF may find itself denying necessary traffic or allowing malicious traffic.

Hence, there exists a need in the art for advanced systems and methods for identifying traffic corresponding to an API.

SUMMARY

Various embodiments of the present disclosure generally relate to network security, and more particularly to systems and methods for discovering APIs for use in relation to network application security.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

DETAILED DESCRIPTION

Various embodiments of the present disclosure generally relate to network security, and more particularly to systems and methods for discovering APIs for use in relation to network application security.

Various embodiments provide systems and methods for discovering an API based upon network traffic. The discovery process includes monitoring network traffic and generating a URL/Schema tree based upon the network traffic. A variety of URL ambiguities and/or schema ambiguities may occur in the URL/Schema tree due to the lack of knowledge of the application issuing the network traffic that adds complexity to the URL/Schema tree. A machine learning process may be employed to reduce the complexity of the URL/Schema tree by combining tree branches based upon an algorithm discussed herein. In some embodiments, the resulting reduced URL/Schema tree is used to make decisions by a network security appliance regarding potential likelihood that identified network traffic is malicious.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Various embodiments may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

In the following description, numerous specific details are set forth in order to provide a thorough understanding of example embodiments. It will be apparent, however, to one skilled in the art that embodiments described herein may be practiced without some of these specific details.

Terminology

Brief definitions of terms used throughout this application are given below.

The terms "connected" or "coupled" and related terms are used in an operational sense and are not necessarily limited to a direct connection or coupling. Thus, for example, two devices may be coupled directly or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein, a "network security appliance" or a "network security device" generally refers to a device or appliance in virtual or physical form that is operable to perform one or more security functions. Some network security devices may be implemented as general-purpose computers or servers with appropriate software operable to perform one or more security functions. Other network security devices may also include custom hardware (e.g., one or more custom Application-Specific Integrated Circuits (ASICs)). A network security device is typically associated with a particular network (e.g., a private enterprise network) on behalf of which it provides one or more security functions. The network security device may reside within the particular network that it is protecting, or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPsec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), and DoS attack detection appliances (e.g., the FORTIDDOS family of DoS attack detection and mitigation appliances).

Some embodiments provide application programming interface discovery systems. Such systems include: a processing resource, and a non-transitory computer-readable medium. The non-transitory computer readable medium has stored therein instructions that when executed by the processing resource cause the processing resource to: receive a tree structure, where the tree structure includes at least a first branch indicating a URL, a method, and a schema corresponding to a first network traffic; receive a second branch indicating a URL, a method, and a schema corresponding to a second network traffic; consider URLs and methods of a number of branches of the tree structure to as a cluster, where the cluster includes at least a subset of the URL and method of first branch and a subset of the URL and method of the second branch; and merge at least some of the schema associated with the branches incorporated in the cluster, wherein at least the schema of the first branch is merged with the schema of the second branch.

In some instances of the aforementioned embodiments, the instructions that when executed by the processing resource further cause the processing resource to: receive the second network traffic, wherein the second network traffic includes the URL, the method, and an endpoint corresponding to the second network traffic; and convert the endpoint of the second network traffic to the schema corresponding to the second network traffic. In some such instances where the endpoint of the second network traffic includes a request and a response, the instructions that when executed by the processing resource further cause the processing resource to: identify the response based upon correspondence to the request; and combine the request and the response into the endpoint. In some cases, the instructions that when executed by the processing resource further cause the processing resource to assemble an API tuple for the second network traffic, where the API tuple is a vector including the URL, the method, and the schema corresponding to the second network traffic, and wherein the API tuple is the second branch.

In various instances of the aforementioned embodiments the URLs and methods are only included in the cluster if the second branch is not identical to the first branch. In some instances of the aforementioned embodiments, the instructions that when executed by the processing resource further cause the processing resource to determine a distance between the URL and method of the first branch and the URL and method of the second branch. In some such instances, the URL and method of first branch and the URL and the method of the second branch are only included in the cluster where the distance between the between the URL and method of the first branch and the URL and method of the second branch is zero. In some cases, determining the distance between the URL and method of the first branch and the URL and method of the second branch is done using a generalized Hamming distance algorithm.

In various instances of the aforementioned embodiments, the instructions that when executed by the processing resource further cause the processing resource to determine a number of schema associated with the cluster. In some such instances, the merge of at least some of the schema associated with the branches incorporated in the cluster is done when the number of schema exceeds a threshold value. In some instances of the aforementioned embodiments where the threshold value is a first threshold value, the instructions that when executed by the processing resource further cause the processing resource to determine a compatibility between the at least some of the schemas associated with the branches in the cluster. In some such instances, the merge of at least some of the schemas associated with the branches incorporated in the cluster is done when the number of schema exceeds a second threshold value and the at least some of the schemas associated with the branches in the cluster are compatible, and wherein the first threshold value is greater than the second threshold value.

Other embodiments provide methods for discovering an application programming interface (API). Such methods include: receiving a tree structure, wherein the tree structure includes at least a first branch indicating a URL, a method, and a schema corresponding to a first network traffic; receiving a second branch indicating a URL, a method, and a schema corresponding to a second network traffic; clustering URLs and methods of a number of branches of the tree structure to yield a cluster, where the cluster includes at least a subset of the URL and method of first branch and a subset of the URL and method of the second branch; and merging at least some of the schema associated with the branches incorporated in the cluster, wherein at least the schema of the first branch is merged with the schema of the second branch.

Yet other embodiments non-transitory computer-readable storage media embodying a set of instructions, which when executed by one or more processing resources of a computer system, causes the one or more processing resources to perform a method including: receiving a tree structure, wherein the tree structure includes at least a first branch indicating a URL, a method, and a schema corresponding to a first network traffic; receiving a second branch indicating a URL, a method, and a schema corresponding to a second network traffic; clustering URLs and methods of a number of branches of the tree structure to yield a cluster, where the cluster includes at least a subset of the URL and method of first branch and a subset of the URL and method of the second branch; and merging at least some of the schema associated with the branches incorporated in the cluster, wherein at least the schema of the first branch is merged with the schema of the second branch.

Figure 1A:
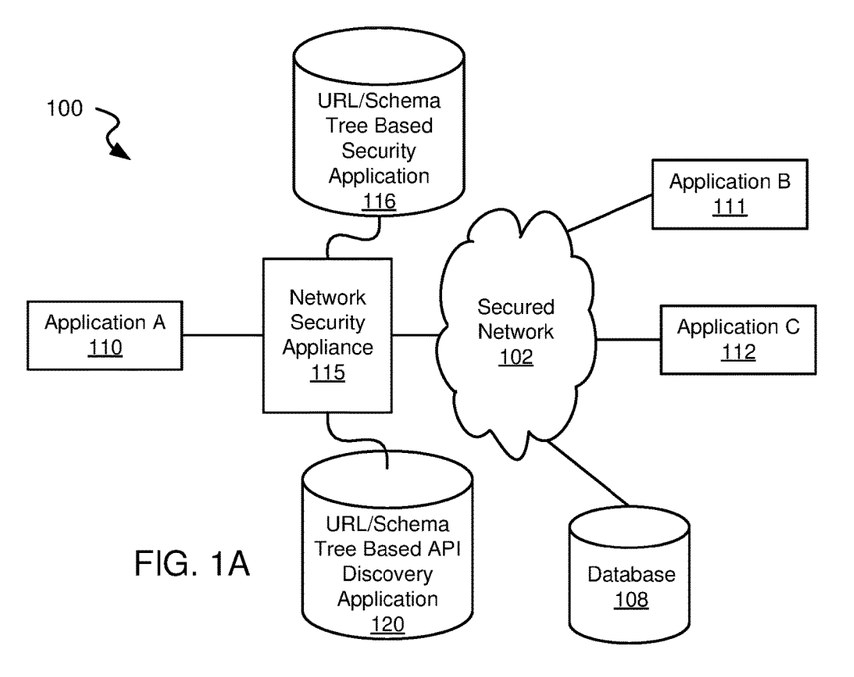
FIGS. 1A-1C illustrates an example network environment including a network security appliance executing a URL/Schema tree based API discovery application and a URL/Schema tree based security application in accordance with various embodiments.

Turning to FIG. 1A, an example network environment 100 is shown in which a URL/Schema tree based API discovery application 120 operates to discover APIs for endpoints (e.g., an application A 110) associated with network traffic passing to/from endpoints (e.g., an application B 111, an application C 112, a database 108) that are part of a secured network 102. Once the API is discovered, the URL/Schema tree representing the API is used by a URL/Schema tree based security application 116 to identify potentially malicious network traffic passing to/from secured network 102. One or both of application 116 and/or application 120 may be executed by a network security appliance 115.

Secured network 102 may be any type of communication network known in the art. Those skilled in the art will appreciate that, secured network 102 can be a wireless network, a wired network or a combination thereof that can be implemented as one of the various types of networks, such as an Intranet, a Local Area Network (LAN), a Wide Area Network (WAN), an Internet, and the like. Further, network 102 can be either a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Figure 1B:
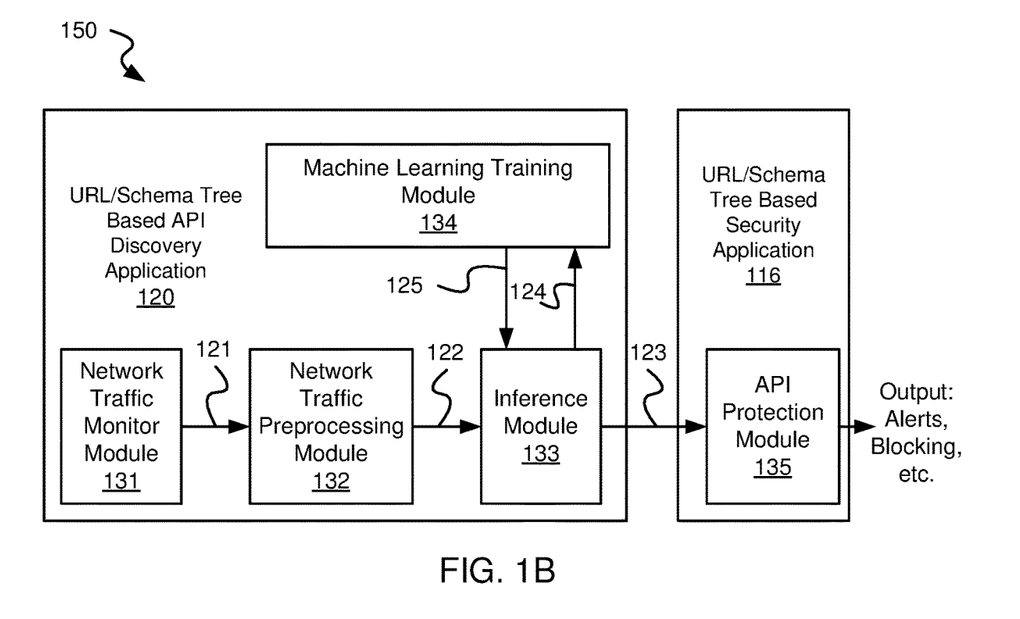

Turning to FIG. 1B, one embodiment of a combination 150 of URL/Schema tree based API discovery application 120 and URL/Schema tree based security application 116 is shown in accordance with one or more embodiments. As shown, URL/Schema tree based API discovery application 120 includes a network traffic monitoring module 131, a network traffic preprocessing module 132, an inference module 133, and a machine learning training module 134. URL/Schema tree based security application 116 includes an API protection module 135.

Network traffic monitoring module 131 is configured to monitor network traffic that passes to and from secured network 102 via network security appliance 115. Such traffic monitoring allows for identification of a number of workloads passing between various endpoints. Network traffic monitoring module 131 provides network traffic 121 to Network traffic preprocessing module 132.

Network traffic preprocessing module 132 is configured to extract various information from the monitored network traffic and to format the traffic into one or more URL/Schema trees representing the URL, method, and schema for each of the network traffic components. In particular, network traffic preprocessing module 132 matches responses in the network traffic associated with a targeted endpoint to corresponding requests, and any request and corresponding response are assembled together into request/response pairs. As an example, the following request and corresponding response may be identified in the network traffic:

Request: Get example.com/userinfo/name=tom
Response: {"address": 899 Kifer Road", "age": 30}.

While the example request is a "Get" request from a URL "example.com/userinfo/" with a parameter "name=tom", one of ordinary skill in the art will recognize a number of different request types that could be expected in an API for an endpoint. Similarly, while the response returns an address and an age of the individual indicated in the parameter of the request, one of ordinary skill in the art will recognize a variety of responses to a given request that could be expected in an API for an endpoint. Thus, based upon the disclosure provided herein, one of ordinary skill in the art will recognize a variety of requests and/or responses that can be identified through monitoring network traffic and incorporated into a discovered API in accordance with different embodiments.

Network traffic preprocessing module 132 is configured to parse the gathered request/response pairs are parsed into URL, Method, and Endpoint data. The URL is the location to which the request is directed, the method is the action of the request, and the endpoint data includes all parameters and the response. Using the example above, the parsing yields the following:

URL: "example.com/userinfo"
Method: "Get"
Endpoint Data:
    Parameter: "name=tom"; and
    Response: {"address": 899 Kifer Road", "age": 30}.

Based upon the disclosure provided wherein, one of ordinary skill in the art will recognize a variety of approaches for parsing the request/response pairs.

Figure 3:
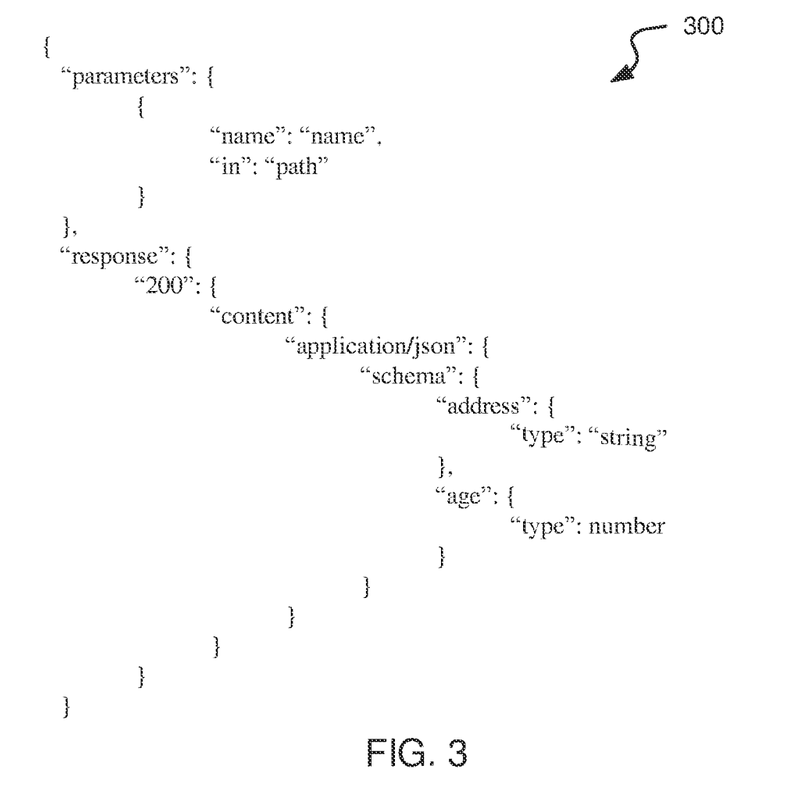
FIG. 3 shows an example of formatting an endpoint data into a JSON schema.

Network traffic preprocessing module 132 is configured to convert the endpoint data for each request/response pair is converted to a generalized schema. Such a generalized schema may be similar to a JavaScript Object Notation (JSON) schema format, or another type of schema known in the art. The entirety of the aforementioned reference is incorporated herein by reference for all purposes. In some cases, while the generalized schema may be similar to known schemas, it may be modified to make it more easily manipulated, merged, and/or modified. Using the preceding example, the aforementioned endpoint data is formatted into a JSON schema as shown as example 300 in FIG. 3.

Figure 6:
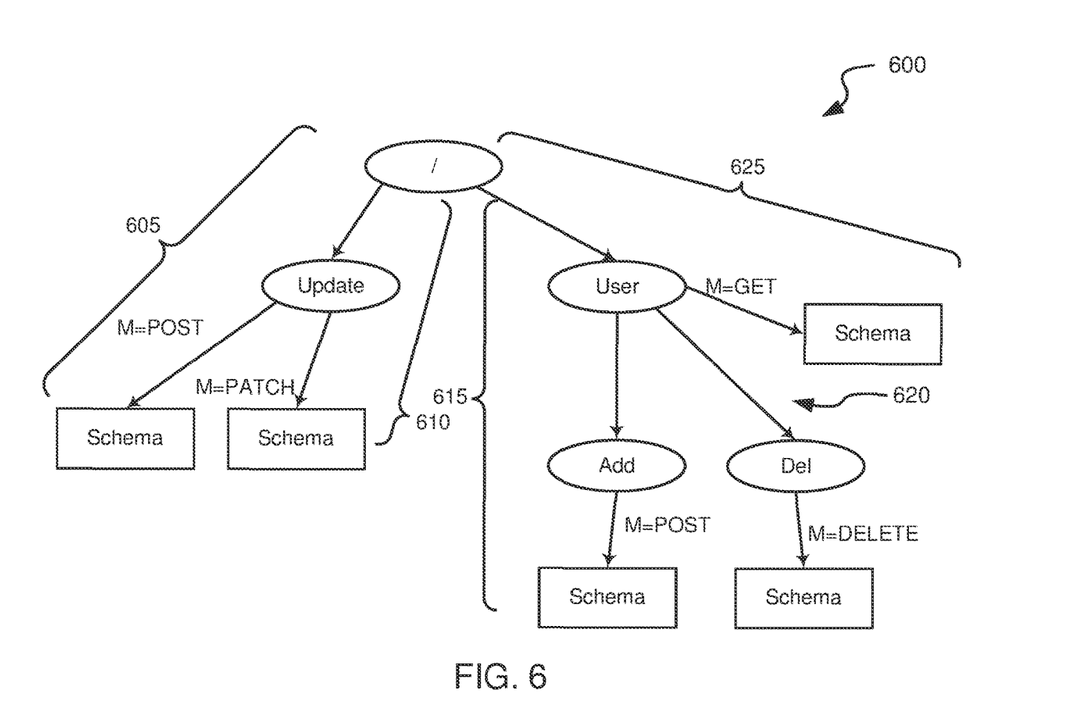
FIGS. 6-8 show example URL/Schema trees that are possible in accordance with some embodiments.

Network traffic preprocessing module 132 is configured to assemble an API tuple for each request/response pair including: (a) URL, (b) method, and (c) schema. Each of these tuples may be represented as a (u, m, s) tuple where the u indicates URL, m indicates Method, and s represents schema. Network traffic preprocessing module 132 is configured to search a URL/Schema tree using the API tuple for a given request/response pair. Turning to FIG. 6, an example URL/Schema tree 600 is shown for the following five endpoints:

(1) GET/user
(2) POST/user/add
(3) DELETE/user/del
(4) POST/update; and
(5) PATCH/update.

As shown, in URL/Schema tree 600 the branches are formed as a combination of URL and Method, and the leaves are schema associated with the particular URL/Method branches. In particular, a branch 605 includes POST/user/update; a branch 610 includes PATCH/user/update; a branch 615 includes POST/user/add; a branch 620 includes DELETE/user/del; and a branch 625 include GET /user. Each of the aforementioned branches has a leaf associated therewith. Network traffic preprocessing module 132 provides the updated URL/Schema tree 122 to inference module 133.

Together inference module 133 and machine learning training module 134 are configured to reduce the URL/Schema tree, and to score branches of the URL/Schema tree. Ultimately, the scored branches of the URL/Schema tree are provided as scores 123 for each branch of a URL/Schema tree formed by URL/Schema tree based API discovery application 120. Machine learning training module 134 operates to combine any new branches 124 (i.e., branches that are not identical to another branch already included in the URL/Schema tree) with existing branches of the URL/Schema tree to yield updated URL/Schema tree 125.

In some embodiments, machine learning training module 134 updates the URL/Schema tree to include new branches 124 using the process discussed below in relation to FIG. 2B. The reduction of the URL schema tree is done by clustering URL/method sets based upon a distance between vectors of the URL/method (i.e., (u, m)). Once zero distance clusters are identified, it is determined whether the number of schema associated with the clustered UR?/methods exceed a first threshold $T_1$. Where the number of schema exceeds or equals the first threshold, all of the schema associated with the URL/method cluster are merged into a single schema. In some embodiments, the value of $T_1$ is user programmable and selected as ten (10). Alternatively, where the number of schema associated with the URL/method cluster is less than $T_1$, greater than a second threshold $T_2$, and the schema are found to be compatible, all of the compatible schema associated with the URL/method cluster are merged into a single schema. In some embodiments, the value of $T_2$ is user programmable and selected as five (5). Such compatibility testing is further described below in relation to FIG. 2B.

Figure 4:
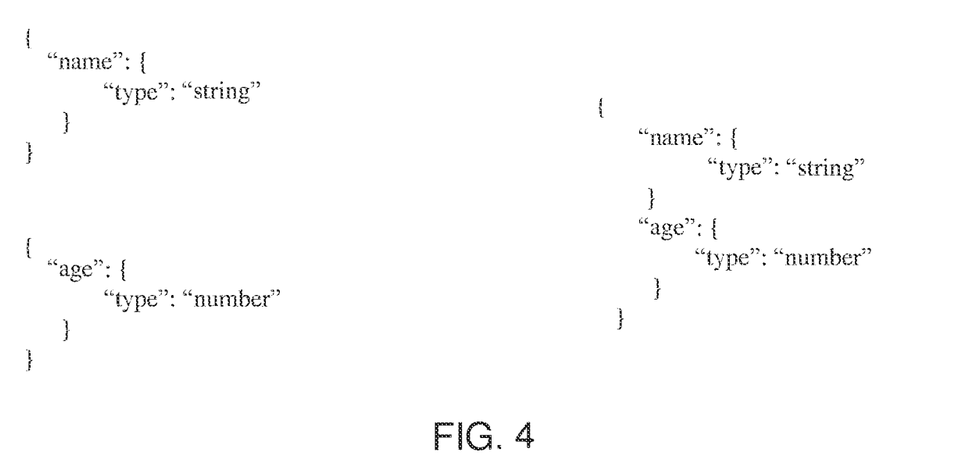
FIG. 4 shows an example of ambiguities possible in discovering an API.

The reduction of the URL/Schema tree at least in part addresses ambiguity that is possible in discovered APIs. As an example, some part of the schema discovered in network traffic may be optional as shown where the following schema (1) and schema (2) may be generated by the same or different APIs:

```
(1)  {                          (2)  {
       "name": "mike"                  "age": 18,
     }                              }
```

The preceding schema may be generated by the following distinct APIs:

```
(1) {                          (2) {
      "name": {                      "age": {
        "type": "string"               "type": "number"
      }                              }
    }                              }
```

Alternatively, the preceding schema may be generated by the following common API:

```
{
  "name": {
    "type": "string"
  }
  "age": {
    "type": "number"
  }
}
```

Figure 5:
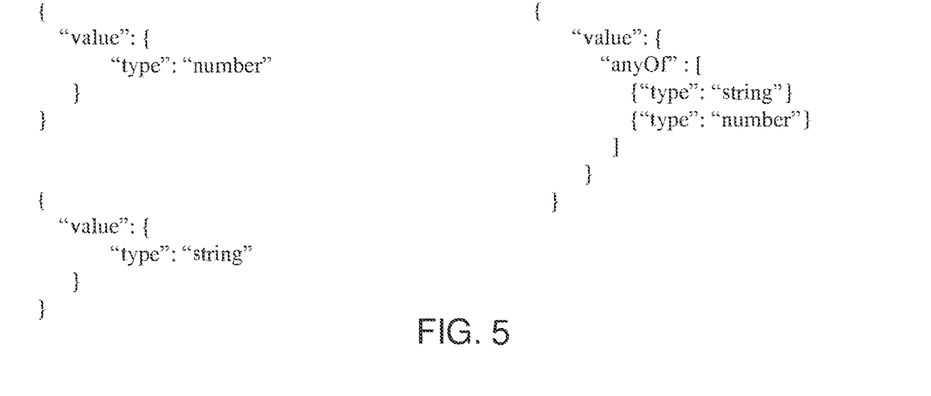
FIG. 5 shows another example of ambiguities possible in discovering an API.

As another example, the OpenAPI standard allows composition of schemas by keywords: anyOf, oneOf, allOf, or the like. The entirety of the aforementioned reference is incorporated herein by reference for all purposes. The following schema (1) and schema (2) demonstrate the ambiguity where they may be generated by the same or different APIs:

```
(3) {                          (4) {
      "value": 100                   "value": "one hundred"
    }                              }
```

The preceding schema may be generated by the following distinct APIs:

```
(3) {                          (4) {
    "value": {                     "value": {
        "type": "number"               "type": "string"
    }                              }
}                              }
```

Alternatively, the preceding schema may be generated by the following common API:

```
{
    "value": {
        "anyOf": [
            {"type": "string"},
            {"type": "number"}
        ]
    }
}
```

Inference module 133 is configured to perform evaluation of incoming API samples. It compares the machine learning model, which is a URL/Schema tree, from training module 134 with the (u, m, s) of the incoming sample and sends samples to the training module to further improve the model. The evaluation of an API sample follows the following steps.

1) Search the corresponding endpoint in the model based on URL+Method. If the corresponding endpoint is not found, then output score 0 and stop, otherwise continue to step 2. Let s* denote the schema of the corresponding endpoint.
2) If s is incompatible with s*, then output score 1 and stop, otherwise continue to step 3;
3) If s is not a subtree of s*, then output score 2 and stop, otherwise continue to step 4;
4) If s is equal to s*, then output score 4, otherwise output score 3.

It can be seen that the security score indicates the degree of compliance between the API sample and the model. While "subtree check" is a well-known tree algorithm, "compatible check" is a new algorithm which will be elaborated later in this document.

API protection module 135 is configured to determine security actions to be taken by network security appliance 115 based in part upon scores for branches of a URL/Schema tree provided by URL/Schema tree based API discovery application 120 and user protection policies. In particular, API protection module 135 receives scores 123 from API discovery application 120. Using these scores, API protection module 135 applies a customized security policy (e.g., blocking, alert) on network traffic processing through network security appliance 115. Based upon the disclosure provided herein, one of ordinary skill in the art will recognize a variety of approaches for using the resulting URL/Schema tree to check against received network traffic in a security application.

Figure 1C:
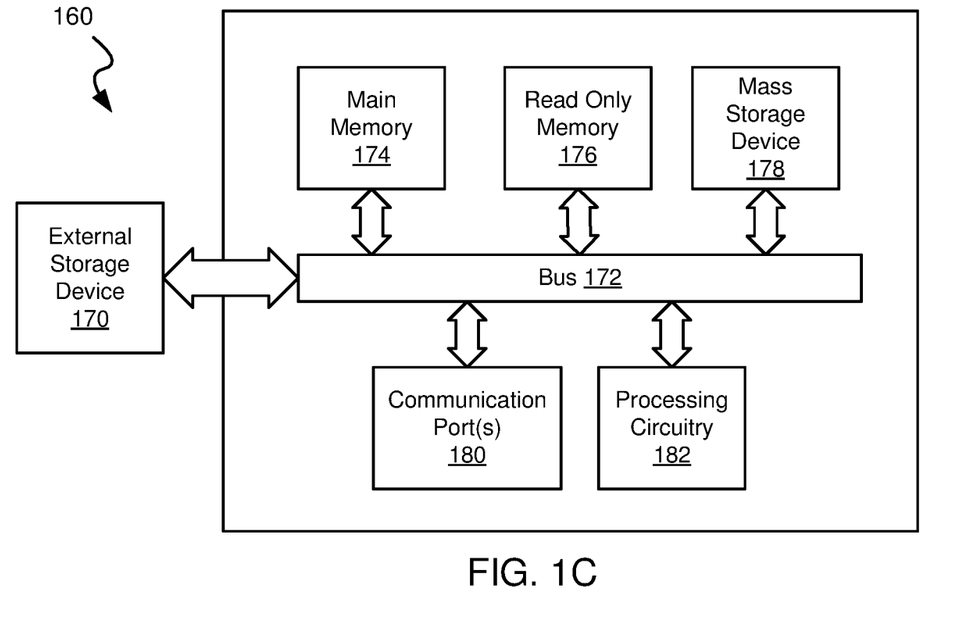

Turning to FIG. 1C, an example computer system 160 in which or with which embodiments of the present disclosure may be utilized is shown. As shown in FIG. 1C computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may be used to perform the functions discussed herein in relation to FIGS. 1A and 2-6. Those skilled in the art will appreciate that computer system 160 may include more than one processing resource and communication port 180. Non-limiting examples of processing circuitry 182 include, but are not limited to: Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processor 1070 may include various modules associated with embodiments of the present disclosure.

Communication port 180 can be any of an RS-232 port for use with a modem-based dialup connection, a 10/100 Ethernet port, a Gigabit, 10 Gigabit, 25 G, 40 G, and 100 G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g. start-up or BIOS instructions for the processing resource.

Mass storage device 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K144), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing resources to software system.

Optionally, operator and administrative interfaces, e.g., a display, keyboard, and a cursor control device, may also be coupled to bus 172 to support direct operator interaction with computer system. Other operator and administrative interfaces can be provided through network connections connected through communication port 180. External storage device 170 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present disclosure have been illustrated and described, numerous modifications, changes, variations, substitutions, and equivalents will be apparent to those skilled in the art. Thus, it will be appreciated by those of ordinary skill in the art that the diagrams, schematics, illustrations, and the like represent conceptual views or processes illustrating systems and methods embodying various non-limiting examples of embodiments of the present disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the particular embodiment. Those of ordinary skill in the art further understand that the exemplary hardware, software, processes, methods, and/or operating systems described herein are for illustrative purposes and, thus, are not intended to be limited to any particular named. While the foregoing describes various embodiments of the disclosure, other and further embodiments may be devised without departing from the basic scope thereof.

Figure 2A:
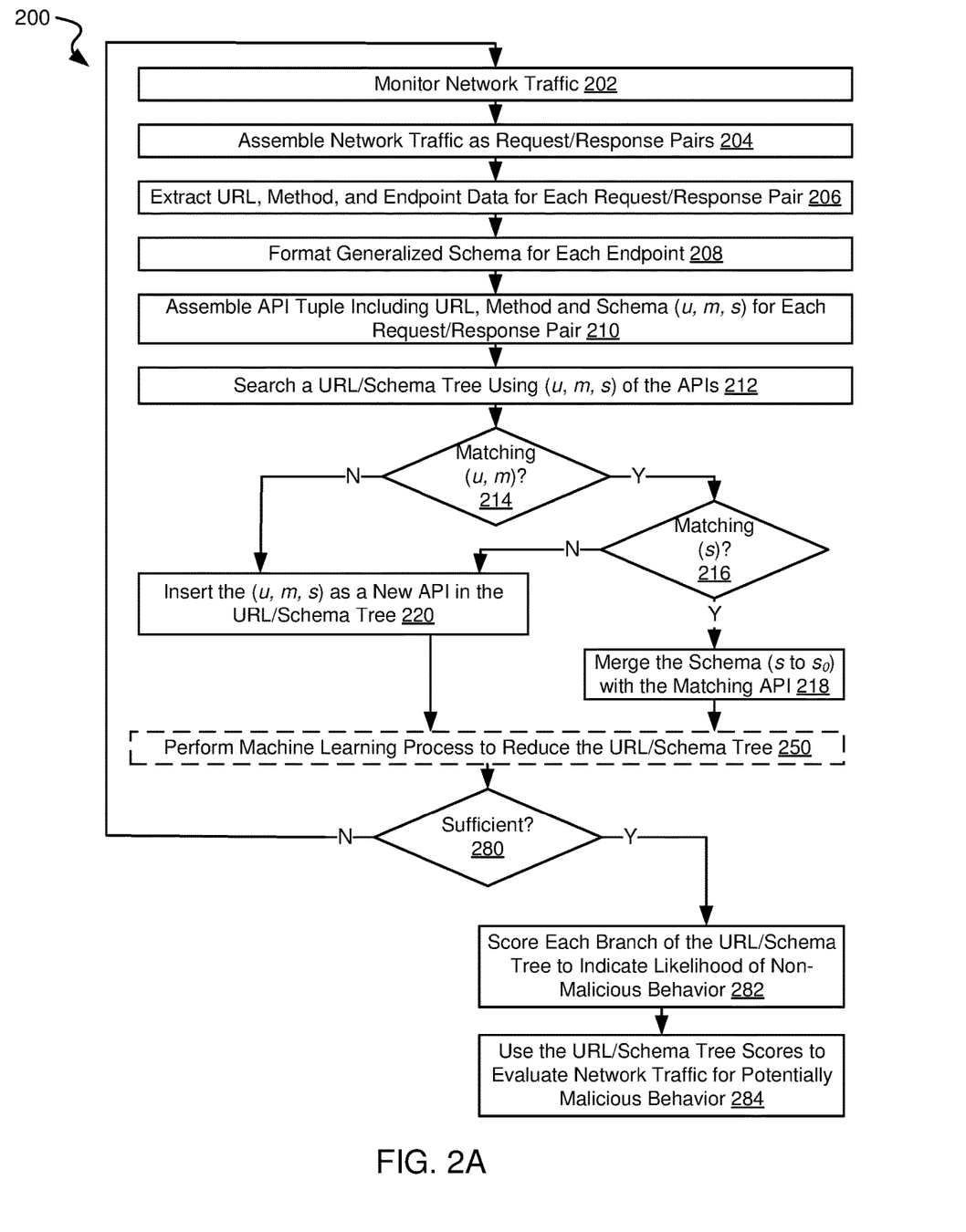
FIGS. 2A-2B are flow diagrams showing a method in accordance with some embodiments for discovering an API and using the discovered API in relation to securing a network.
Figure 2B:
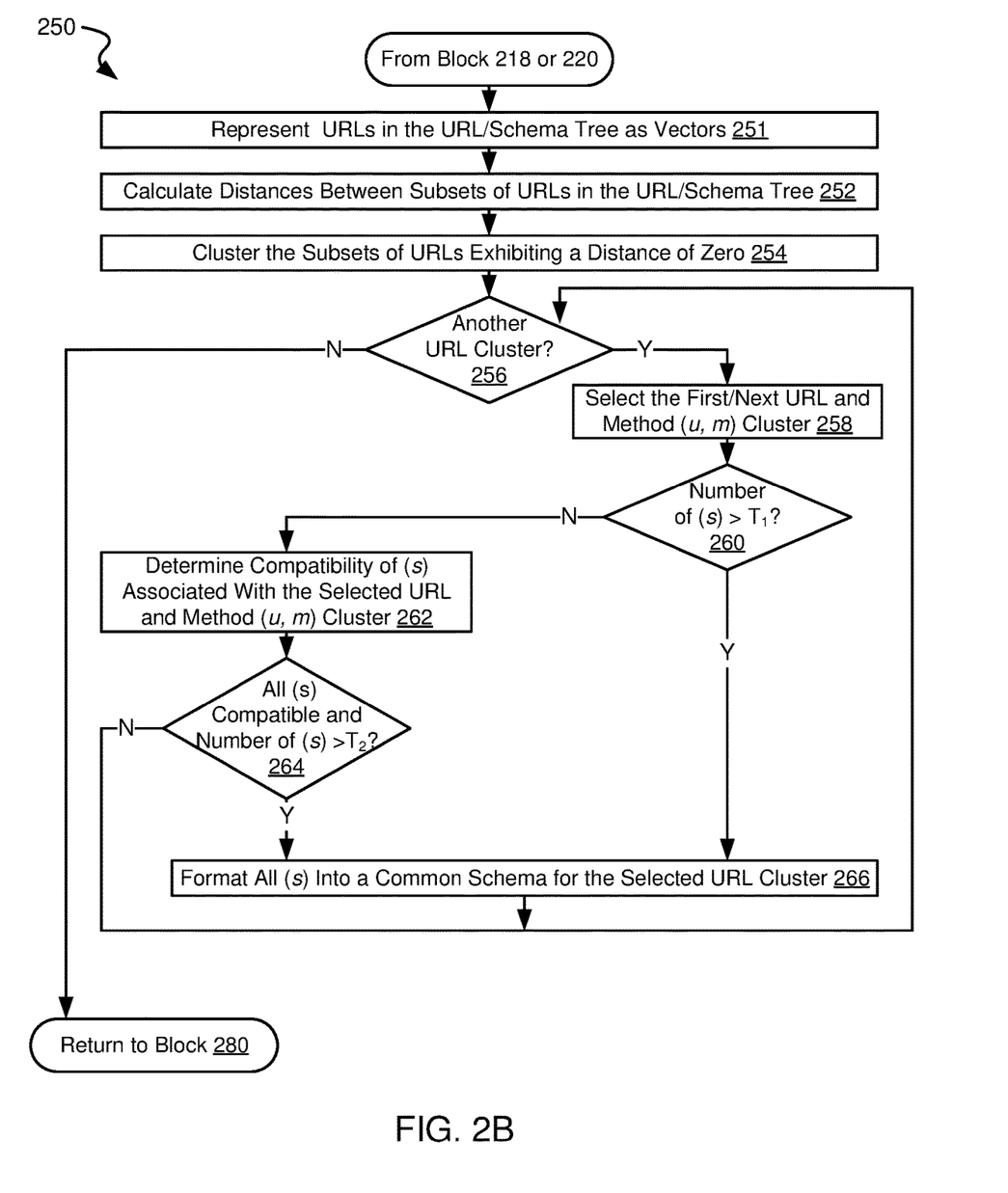

Turning to FIGS. 2A-2B, flow diagrams 200, 250 show a method in accordance with some embodiments for discovering an API and using the discovered API in relation to securing a network. Following flow diagram 200 of FIG. 2A, network traffic is monitored that passes to and from the network (block 202). Such traffic monitoring allows for identification of a number of requests and corresponding responses passing between various endpoints. Network traffic associated with a particular endpoint is gathered together. Such monitoring may rely, for example, on meta information such as, for example, source and destination of the network traffic, the ports used for the network communication, the protocol used for the communication, other characteristics regarding the application communication that are derived from deep-packet inspection of the traffic.

Responses in the network traffic associated with a targeted endpoint are matched to corresponding requests, and any request and corresponding response are assembled together into request/response pairs (block 204). As an example, the following request and corresponding response may be identified in the network traffic:

Request: Get example.com/userinfo/name=tom
Response: {"address": 899 Kifer Road", "age": 30}.

While the example request is a "Get" request from a URL "example.com/userinfo/" with a parameter "name=tom", one of ordinary skill in the art will recognize a number of different request types that could be expected in an API for an endpoint. Similarly, while the response returns an address and an age of the individual indicated in the parameter of the request, one of ordinary skill in the art will recognize a variety of responses to a given request that could be expected in an API for an endpoint. Thus, based upon the disclosure provided herein, one of ordinary skill in the art will recognize a variety of requests and/or responses that can be identified through monitoring network traffic and incorporated into a discovered API in accordance with different embodiments.

The gathered request/response pairs are parsed into URL, Method, and Endpoint data (block 206). The URL is the location to which the request is directed, the method is the action of the request, and the endpoint data includes all parameters and the response. Using the example above, the parsing yields the following:

URL: "example.com/userinfo"
Method: "Get"
Endpoint Data:
    Parameter: "name=tom"; and
    Response: {"address": 899 Kifer Road", "age": 30}.

Based upon the disclosure provided wherein, one of ordinary skill in the art will recognize a variety of approaches for parsing the request/response pairs.

The endpoint data for each request/response pair is converted to a generalized schema (which at times is referred to as a Schema Tree) (block 208). Such a generalized schema may be similar to a JSON schema format, or another type of schema known in the art. In some cases, while the generalized schema may be similar to known schemas, it may be modified to make it more easily manipulated, merged, and/or modified. Using the preceding example, the aforementioned endpoint data is formatted into a JSON schema as shown as example 300 in FIG. 3. At this juncture, it is only necessary that the conversion to a generalized schema is to one schema that could represent the endpoint data. As more fully discussed below, a machine learning model is used to merge multiple different schemas for a given URL and Method to consolidate an API that can be used in relation to performing network security.

An API tuple is assembled for each request/response pair including: (a) URL, (b) method, and (c) schema (block 210). Each of these tuples may be represented as a (u, m, s) tuple where the u indicates URL, m indicates Method, and s represents schema. A URL/Schema tree is searched using the API tuple for a given request/response pair (block 212). Turning to FIG. 6, an example URL/Schema tree 600 is shown for the following five endpoints:

(1) GET/user
(2) POST/user/add
(3) DELETE/user/del
(4) POST/update; and
(5) PATCH/update.

As shown, in URL/Schema tree 600 the branches are formed as a combination of URL and Method, and the leaves are schema associated with the particular URL/Method branches. In particular, a branch 605 includes POST/user/update; a branch 610 includes PATCH/user/update; a branch 615 includes POST/user/add; a branch 620 includes DELETE/user/del; and a branch 625 include GET /user. Each of the aforementioned branches has a leaf associated therewith.

Where the search reveals an identical match between the URL and Method (i.e., (u, m)) of the newly assembled tuple and a branch of the URL/Schema tree (block 214), it is further determined whether there is also a match between the schema (i.e., (u, m, s)) of the newly assembled tuple and the schema associated with the matching branch of the URL/Schema tree (block 216). Where the schema of the newly assembled tuple matches the schema associated with the matching branch of the URL/Schema tree (block 216), the matching schema are merged (i.e., s to $s_0$) (block 218). Such a merger does not result in any change to the URL/Schema tree.

Figure 7:
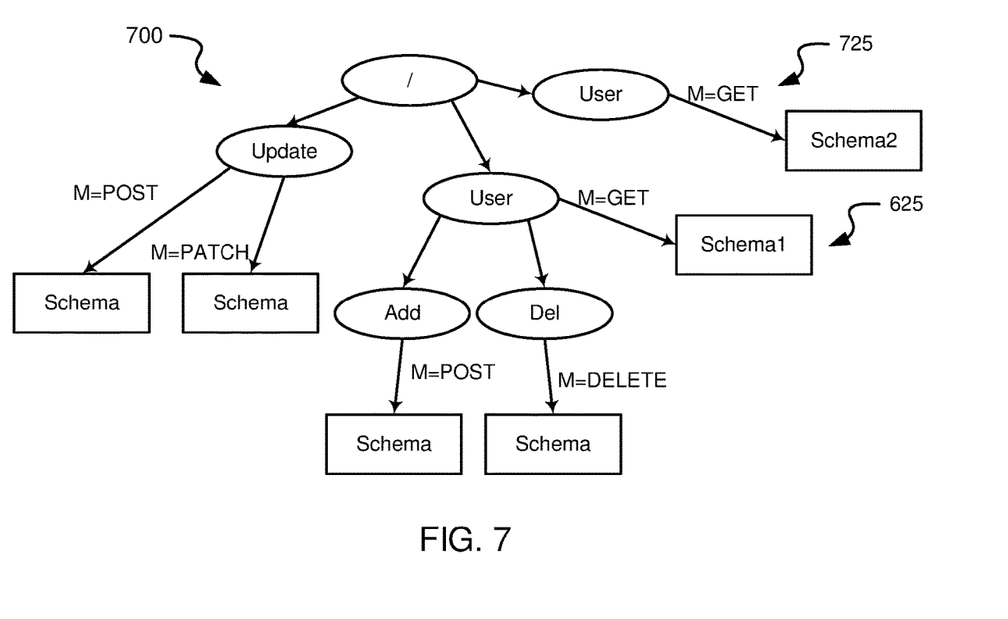

Alternatively, where either the is no match between the URL and Method (i.e., (u, m)) of the newly assembled tuple and a branch of the URL/Schema tree (block 214) or there is no match between the schema (i.e., (u, m, s)) of the newly assembled tuple and the schema associated with the matching branch of the URL/Schema tree (block 216), a new branch/schema is added to the URL/Schema tree (block 220). FIG. 7 shows an example URL/Schema tree 700 where an endpoint for the previous example branch 625 includes a schema (i.e., schema2) that is different from the schema (i.e., schema2) that was previously incorporated in the URL/Schema tree. In such a situation, the search process results in the addition of a new branch 725 including schema2 that is in addition to the old branch 625 including schema1. FIG.

Figure 8:
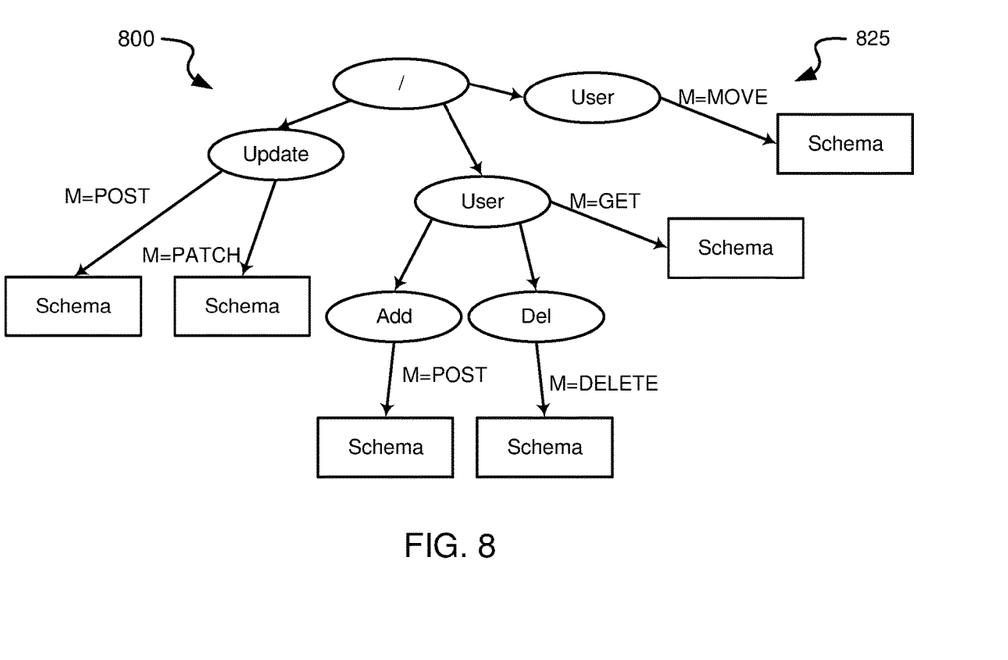

8 shows an example URL/Schema tree 800 where the newly assembled tuple (i.e., MOVE/user) does not match any prior branch of the URL/Schema tree. In such a situation, the search process results in the addition of a new branch 825 representing the newly assembled tuple. It is noted that the aforementioned are merely examples and that based upon the disclosure provided herein, one of ordinary skill in the art will recognize a variety of examples that may result from the search process (blocks 214-220) of FIG. 2A.

Returning to FIG. 2A, a machine learning process is applied to reduce the URL/Schema tree (block 250). This process is shown in dashed lines as it is represented by a flow diagram 250 of FIG. 2B. In some embodiments, the each schema in the URL/Schema tree is represented in a code form that is easily manipulated by a computer. An example schema tree node is shown below in C++ language:

```
struct SchemaTree {
    string label;
    string type;
    SchemaTree* children[ ];
}
```

There are also many optional fields, which can be included in the schema tree, e.g., data range, data format etc. The following example shows a standard JSON schema converted to the above-mentioned schema tree format:

| JSON FORMAT | SCHEMA TREE FORMAT |
|---|---|
| { <br>   "info" : { <br>     "type" : "object", <br>     "properties": { <br>       "name": { <br>         "type" : "string" <br>       } <br>       "age" : { <br>         "type": "number" <br>       } <br>     } <br>   } <br> } | { <br>   "label": "info" <br>   "type": "object", <br>   "children": [ <br>     { <br>       "label" : "name", <br>       "type" : "string" <br>     }, <br>     { <br>       "label" : "age", <br>       "type" : "number" <br>     } <br>   ] <br> } |

Based upon the disclosure provided herein, one of ordinary skill in the art will recognize a variety of code forms that may be used to represent the URL/Schema tree. By forming the assembled tuples into a URL/Schema tree format and representing it by a code form that can be manipulated by a computer, various well-known tree algorithms may be used including, but not limited to, subtree check. Such a subtree check determines whether one of two branches or trees (i.e., a tree A and a tree B) is a subtree of the other. In addition, an algorithm new to this disclosure (i.e., a compatibility algorithm) is used on the URL/Schema tree to determine compatibility.

Turning to FIG. 2B and following flow diagram 250, each of the URLs in the URL/Schema tree are represented as vectors (block 251). For example, a URL/service/user/info can be represented as a vector of the following segments:

| SEGMENT 1 | SEGMENT 2 | SEGMENT 3 |
|---|---|---|
| service | user | info |

Thus, the overall vector for the URL is [service, user, info]. Each of the branches in the URL/Schema tree is represented as a respective vector. For convenience, for an endpoint, we always append its method to the end of its URL vector. Thus, for example, the branches of URL/Schema tree 700 may be represented as the following series of vectors:

Branch 605: [Update, POST];
Branch 610: [Update, PATCH];
Branch 615: [User, Add, POST];
Branch 620: [User, Del, DELETE];
Branch 625: [User, GET];
Branch 725: [User, GET].

A distance between subsets of URLs in the URL/Schema tree are calculated (block 252). In some embodiments, the distance is calculated as a generalized Hamming distance (GHD). Such GHD may be calculated in accordance with the following algorithm:

Given two vectors (may have different dimensions): $u=[u_0, u_1, \ldots, u_{m-1}]$ and $v=[v_0, v_1, \ldots, v_{n-1}]$, the generalized Hamming distance with mask i is defined as:

$$ghd_i(u, v) = \sum_{k=0, k \neq i}^{min(m-1, n-1)} \delta(u_k, v_k) + |m - n|,$$

$$\text{where } \delta(x, y) = \begin{cases} 0, & \text{if } x = y \\ 1, & \text{if } x \neq y \end{cases}.$$

From the definition, we can see that GHD generalizes Hamming distance, which requires two vectors to have the same dimensions. Since we only need GHD with mask 0 in URL clustering, thus, without loss of generality, when referring to GHD in the following content, we always refer to GHD with mask 0.

Subsets of URL vectors exhibiting a GHD of zero are clustered together (block 254). The GHD is calculated for subsets of the URL vectors to reveal which of the subsets exhibit a GHD of 0. As an example, the GHD the following two URL vectors is 0:

[a, b, c, d] and [b, b, c, d].

Thus, URL vectors [a, b], [b, b], [a, b, c], [b, b, c], and [d] can be clustered into the following three URL classes each having an inner distance of zero:

Class 1: [a, b], and [b, b];
Class 2: [a, b, c], and [b, b, c]; and
Class 3: [d].

It is determined if another URL cluster remains for processing (block 256). Each of the URLs that are included in a particular URL class cluster are associated with a schema, and the number of schema associated with a given class cluster is used as an indication that the identified class cluster is actually a meaningful URL that can be used in detecting expected traffic in a network environment. This is because the endpoint (formed into a schema) associated with a particular URL will typically change a number of times depending upon the particular command and/or information requested. While the endpoint is changing, the URL remains constant. Accordingly, a class cluster associated with a meaningful number of changing endpoint data is considered a useful URL.

Where another cluster remains (block 256), the first/next URL cluster to be processed is selected (block 258). It is determined how many schema are associated with each of the URL cluster classes formed in block 254 (block 260). Where the number of schema for the selected cluster class exceeds a user programmable threshold $T_1$ (block 260) all of the schema associated with the class cluster are formed into a common schema (block 266). As an example, given the following two schema associated with a particular class cluster:

| Schema 1 | Schema 2 |
|---|---|
| {<br>  "label": "info"<br>  "type": "object",<br>  "children": [<br>    {<br>      "label" : "name",<br>      "type" : "string"<br>    }<br>  ]<br>} | {<br>  "label": "info"<br>  "type": "object",<br>  "children": [<br>    {<br>      "label" : "age",<br>      "type" : "number"<br>    }<br>  ]<br>} |

Are reformatted into a single common schema associated with the particular URL cluster class:

```
{
    "label": "info"
    "type": "object",
    "children": [
        {
            "label" : "name"
            "type" : "string"
        },
        {
            "label" : "age",
            "type" : "number"
        }
    ]
}
```

Such formatting of all of the schemas into a commonly formatted schema may use a merge operation common to tree structures. In such a merge situation, the following rules are applied to merge two branches (e.g., a branch A and a branch B) where branch C is the merge result of branch A+branch B (i.e., C=A+B):

(1) If A.type==null, then C=B;
(2) If A.type !=B.type, then C.type=anyOf, and C.children=[A, B];
1) If A.type==B. type, then C.type=A.type, C.children=A.children+B.children.

Alternatively, where the number of schemas associated with the selected URL cluster is not greater than the threshold $T_1$ (block 260), it is determined whether the schema associated with the selected URL cluster are compatible with each other (block 262). Two schemas are found to be compatible if:

1) They both have the same label;
2) They both have the same type (e.g., number or string) or either of the two schemas have type null or anyOf;
3) If both A and B have object type, then child of A is compatible with child of B if they have the same label.

This compatibility rule is premised on an assumption that two samples generated from the same API are generally compatible. Where schemas for a given branch are compatible and the number of compatible schemas is greater than a threshold $T_2$ (block 264), all of the schemas associated with the class cluster are formed into a common schema (block 266). Threshold $T_2$ is less than threshold $T_1$. In some embodiments, $T_1$ is ten (10) and $T_2$ is five (5).

The processes of flow diagram 250 operate to address URL ambiguity that is possible in discovered APIs. Such ambiguity may include, for example, URL ambiguity where the following two samples have similarities, but may not belong to the same API:

GET /user/a

GET /user/b

The ambiguity comes because the detected network traffic may come from two separate APIs (i.e., GET /user/a and GET /user/b) or may come from the same API (i.e., GET /user/{arg} where {arg} is a parameter. Another URL ambiguity may occur because a parameter may appear anywhere in a network transaction. For example:

/{arg1}/b/{arg2}/c

/a/{arg1}/c

/a/b/{arg1} are all possible instances of the network traffic that are addressed through the URL clustering processes discussed above.

The processes of flow diagram 250 operate to address Schema ambiguity that is possible in discovered APIs. As an example, some part of the schema discovered in network traffic may be optional as shown where the following schema (1) and schema (2) may be generated by the same or different APIs:

| (5){<br>  "name": "mike"<br>} | (6){<br>  "age": 18,<br>} |
|---|---|

The preceding schema may be generated by the following distinct APIs:

| (5){<br>  "name": {<br>    "type": "string"<br>  }<br>} | (6){<br>  "age": {<br>    "type": "number"<br>  }<br>} |
|---|---|

Alternatively, the preceding schema may be generated by the following common API:

```
{
    "name": {
        "type": "string"
    }
    "age": {
        "type": "number"
    }
}
```

As another example, the OpenAPI standard allows composition of schemas by keywords: anyOf, oneOf, allOf, or the like. The following schema (1) and schema (2) demonstrate the ambiguity where they may be generated by the same or different APIs:

| (7){<br>  "value": 100<br>} | (8){<br>  "value": "one hundred"<br>} |
|---|---|

The preceding schema may be generated by the following distinct APIs:

```
(7){                        (8){
    "value": {                  "value": {
        "type": "number"            "type": "string"
    }                           }
}                           }
```

Alternatively, the preceding schema may be generated by the following common API:

```
{
    "value": {
        "anyOf": [
            {"type": "string"},
            {"type": "number"}
        ]
    }
}
```

The processes of flow diagram 250 continue until all URL clusters for the URL/Schema tree have been processed (block 256). Once no more URL clusters remain for processing (block 256), processing is returned to block 280 of FIG. 2A.

Returning to FIG. 2A, it is determined if sufficient processing has occurred to discover a proxy of an API for a given application (block 280). In some embodiments, the proxy of the API is considered sufficient or converged where the number of changes to the URL/Schema tree occur at a rate below a defined threshold or where the rate of change is constant. Where the processing is not yet sufficient (block 280), the processes of blocks 202-280 are repeated.

Alternatively, where the processing is sufficient (block 280), each branch of the current URL/Schema tree are scored to indicate a likelihood that transactions corresponding to the particular branch are non-malicious behavior (block 282), and the URL/Schema tree scores are deployed to evaluate network traffic for potentially malicious behavior (block 284). The processes of blocks 282 and 284 comprise what can be commonly described as API protection. Such processes involve application of a customized security policy (e.g., blocking, alert) on network traffic that matches a branch of the URL/Schema tree. Based upon the disclosure provided herein, one of ordinary skill in the art will recognize a variety of approaches for using the resulting URL/Schema tree to check against received network traffic in a security application.

While embodiments of the present disclosure have been illustrated and described, numerous modifications, changes, variations, substitutions, and equivalents will be apparent to those skilled in the art. Thus, it will be appreciated by those of ordinary skill in the art that the diagrams, schematics, illustrations, and the like represent conceptual views or processes illustrating systems and methods embodying various non-limiting examples of embodiments of the present disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the particular embodiment. Those of ordinary skill in the art further understand that the example hardware, software, processes, methods, and/or operating systems described herein are for illustrative purposes and, thus, are not intended to be limited to any particular name. While the foregoing describes various embodiments of the disclosure, other and further embodiments may be devised without departing from the basic scope thereof.

What is claimed is:

1. A network security appliance comprising:
a memory storing one or more instructions:
one or more processors to execute the one or more instructions to:
receive network traffic packets via a network;
process the network traffic packets to extract information to a targeted endpoint;
generate a plurality of request response pairs based on the extracted information, wherein a request response pair comprises a request to the targeted endpoint matched with a corresponding response;
generate a URL, a method, and a schema based on the plurality of request response pairs associated with the targeted endpoint;
generate a tree structure including at least a first branch indicating a URL, a method, and a schema corresponding to a first network traffic and a second branch indicating a URL, a method, and a schema corresponding to a second network traffic;
generate a first tree score associated with the first branch and a second tree score associated with the second branch, wherein a tree score indicates a likelihood that a transaction corresponding to a tree branch represents a non-malicious behavior; and
apply a customized security policy on the network traffic packets based on the first and second tree scores.

2. The network security appliance of claim 1, wherein the one or more processors further to execute a machine learning model to reduce the tree structure.

3. The network security appliance of claim 2, wherein reducing the tree structure comprises:
generating a cluster including the URLs and methods of the first and second tree branches of the tree structure to as the cluster, wherein the cluster includes at least a subset of the URL and method of the first branch and a subset of the URL and method of the second branch; and
merging the schema of the first branch with the schema of the second branch.

4. The network security appliance of claim 3, wherein reducing the tree structure further comprises:
determining a distance between the URL and method of the first branch and the URL and method of the second branch; and
including the URL and method of the first branch and the URL and the method of the second branch in the cluster upon a determination that the distance between the between the URL and method of the first branch and the URL and method of the second branch is zero.

5. The network security appliance of claim 4, wherein determining the distance between the URL and method of the first branch and the URL and method of the second branch is implemented via a general Hamming distance algorithm.

6. The network security appliance of claim 3, wherein reducing the tree structure further comprises:
   determining a quantity of schema associated with the cluster; and
   merging of schema associated with the branches incorporated in the cluster upon a determination that the quantity of schema exceeds a threshold value.

7. The network security appliance of claim 6, wherein the threshold value comprises a first threshold value.

8. The network security appliance of claim 7, wherein reducing the tree structure further comprises:
   determining a compatibility between the schema associated with the branches in the cluster; and
   merging the schema associated with the branches incorporated in the cluster upon a determination that the quantity of schema exceeds a second threshold value and the schema associated with the branches in the cluster are compatible.

9. The network security appliance of claim 1, wherein the one or more processors further to:
   receive the network traffic to the targeted endpoint; and
   evaluate the network traffic using the first tree score and the second tree score to determine whether the network traffic comprises malicious behavior.

10. A method comprising:
    receiving network traffic packets via a network;
    processing the network traffic packets to extract information to a targeted endpoint;
    generating a plurality of request response pairs based on the extracted information, wherein a request response pair comprises a request to the targeted endpoint matched with a corresponding response;
    generating a URL, a method, and a schema based on the plurality of request response pairs associated with the targeted endpoint;
    generating a tree structure including at least a first branch indicating a URL, a method, and a schema corresponding to a first network traffic and a second branch indicating a URL, a method, and a schema corresponding to a second network traffic;
    generating a first tree score associated with the first branch and a second tree score associated with the second branch, wherein a tree score indicates a likelihood that a transaction corresponding to a tree branch represents a non-malicious behavior; and
    applying a customized security policy on the network traffic packets based on the first and second tree scores.

11. The method of claim 10, further comprising executing a machine learning model to reduce the tree structure, including:
    generating a cluster including the URLs and methods of the first and second tree branches of the tree structure to as the cluster, wherein the cluster includes at least a subset of the URL and method of the first branch and a subset of the URL and method of the second branch; and
    merging the schema of the first branch with the schema of the second branch.

12. The method of claim 11, wherein reducing the tree structure further comprises:
    determining a distance between the URL and method of the first branch and the URL and method of the second branch; and
    including the URL and method of the first branch and the URL and the method of the second branch in the cluster upon a determination that the distance between the URL and method of the first branch and the URL and method of the second branch is zero.

13. The method of claim 12, wherein reducing the tree structure further comprises:
    determining a quantity of schema associated with the cluster; and
    merging of schema associated with the branches incorporated in the cluster upon a determination that the quantity of schema exceeds a first threshold value.

14. The method of claim 13, wherein reducing the tree structure further comprises:
    determining a compatibility between the schema associated with the branches in the cluster; and
    merging the schema associated with the branches incorporated in the cluster upon a determination that the quantity of schema exceeds a second threshold value and the schema associated with the branches in the cluster are compatible.

15. The method of claim 10, further comprising:
    receiving network traffic to the targeted endpoint; and
    evaluating the network traffic using the first tree score and the second tree score to determine whether the network traffic comprises malicious behavior.

16. A non-transitory computer-readable storage medium embodying a set of instructions, which when executed by one or more processors, causes the one or more processors to:
    receive network traffic packets via a network;
    process the network traffic packets to extract information to a targeted endpoint;
    generate a plurality of request response pairs based on the extracted information, wherein a request response pair comprises a request to the targeted endpoint matched with a corresponding response;
    generate a URL, a method, and a schema based on the plurality of request response pairs associated with the targeted endpoint;
    generate a tree structure including at least a first branch indicating a URL, a method, and a schema corresponding to a first network traffic and a second branch indicating a URL, a method, and a schema corresponding to a second network traffic;
    generate a first tree score associated with the first branch and a second tree score associated with the second branch, wherein a tree score indicates a likelihood that a transaction corresponding to a tree branch represents a non-malicious behavior; and
    apply a customized security policy on the network traffic packets based on the first and second tree scores.

17. The non-transitory computer-readable storage medium of claim 16, embodying a set of instructions, which when executed by the one or more processors, further causes the one or more processors to execute a machine learning model to reduce the tree structure, including:
    generating a cluster including the URLs and methods of the first and second tree branches of the tree structure to as the cluster, wherein the cluster includes at least a subset of the URL and method of the first branch and a subset of the URL and method of the second branch; and
    merging the schema of the first branch with the schema of the second branch.

18. The non-transitory computer-readable storage medium of claim 17, wherein reducing the tree structure further comprises:

determining a distance between the URL and method of the first branch and the URL and method of the second branch; and including the URL and method of the first branch and the URL and the method of the second branch in the cluster upon a determination that the distance between the between the URL and method of the first branch and the URL and method of the second branch is zero.

19. The non-transitory computer-readable storage medium of claim 18, wherein reducing the tree structure further comprises:

determining a quantity of schema associated with the cluster; and merging of schema associated with the branches incorporated in the cluster upon a determination that the quantity of schema exceeds a threshold value.

20. The non-transitory computer-readable storage medium of claim 19, wherein reducing the tree structure further comprises:

determining a compatibility between the schema associated with the branches in the cluster; and merging the schema associated with the branches incorporated in the cluster upon a determination that the quantity of schema exceeds a second threshold value and the schema associated with the branches in the cluster are compatible.

21. The non-transitory computer-readable storage medium of claim 17, embodying a set of instructions, which when executed by the one or more processors, further causes the one or more processors to:

receive the network traffic to the targeted device; and evaluate the network traffic using the first tree score and the second tree score to determine whether the network traffic comprises malicious behavior.

* * * * *